United States Patent [19]

Sarokin

[11] Patent Number: 4,940,962
[45] Date of Patent: Jul. 10, 1990

[54] FRONT MOUNTED VEHICLE BRAKING INDICATOR

[76] Inventor: Jerry L. Sarokin, 33632 Old Timber, Farmington Hills, Mich. 48018

[21] Appl. No.: 158,878

[22] Filed: Feb. 22, 1988

[51] Int. Cl.$^5$ .................................................. B60Q 1/44
[52] U.S. Cl. ...................................... 340/479; 340/466
[58] Field of Search ...................... 340/66, 67, 69, 71, 340/73, 84, 479, 466, 467, 464; 200/61.89

[56] References Cited

U.S. PATENT DOCUMENTS

| | | | |
|---|---|---|---|
| 3,364,384 | 1/1968 | Dankert | 340/66 X |
| 3,411,134 | 11/1968 | Shames | 340/71 |
| 3,510,838 | 5/1970 | Otto | 340/71 |
| 3,550,076 | 12/1970 | Kent | 340/22 |
| 3,601,794 | 8/1971 | Klein et al. | 340/62 |
| 3,631,390 | 12/1971 | Murphy | 340/62 |
| 3,659,268 | 4/1972 | Crawford | 340/71 |
| 3,688,258 | 8/1972 | Frey | 340/67 |
| 3,702,459 | 11/1972 | Bauchan | 340/62 |
| 3,708,782 | 1/1973 | Mori | 340/66 |
| 3,710,315 | 1/1973 | Scherenberg | 340/71 X |
| 3,748,642 | 7/1973 | Radin et al. | 340/62 |
| 3,784,974 | 1/1974 | Hamashige | 340/73 |
| 3,914,739 | 10/1975 | Caughlin et al. | 340/72 |
| 3,952,284 | 4/1976 | Martin | 340/71 |
| 4,107,647 | 8/1978 | Yoshino | 340/71 |
| 4,127,844 | 11/1978 | Purdy | 340/71 |
| 4,173,012 | 10/1979 | Burger | 340/71 |
| 4,258,353 | 3/1981 | Carlson | 340/71 |
| 4,280,116 | 7/1981 | Camp | 340/66 |
| 4,384,269 | 5/1983 | Carlson | 340/67 |
| 4,470,036 | 9/1984 | Doerr et al. | 340/66 |

FOREIGN PATENT DOCUMENTS

| | | | |
|---|---|---|---|
| 1187032 | 9/1959 | France | 340/71 |
| 0068436 | 5/1980 | Japan | 340/71 |

Primary Examiner—Joseph A. Orsino
Assistant Examiner—Brian R. Tumm
Attorney, Agent, or Firm—Basile and Hanlon

[57] ABSTRACT

A braking indicator for vehicles provides an indication from the front of the vehicle that the vehicle brakes are being applied. The indicator includes a plurality of lights, preferably two, which are mounted and viewable from the front of the vehicle. The first sensor is connected to the brake pedal to detect the initial depression of the brake pedal. A second sensor is connected to the brake system of the vehicle to sense further depression of the brake pedal. The first and second sensors are connected to certain of the front mounted indicator lights to energize certain of the front mounted indicator lights upon the initial depression of brake pedal and further depression of the brake pedal. Alternately, a sensor is connected to the speedometer of the vehicle to detect the speed of the vehicle. The speed sensor provides an output when the vehicle reaches a pre-determined speed, preferably a slow speed. The second sensor and the speed sensor cooperate to energize certain of the indicator lights during continued depression of the brake pedal when the vehicle reaches the pre-set slow speed.

4 Claims, 3 Drawing Sheets

FRONT MOUNTED VEHICLE BRAKING INDICATOR

This is a substitute of Ser. No. 695,801, now abandoned.

BACKGROUND OF THE INVENTION

1. Field of the Invention:

This invention relates, in general, to vehicle brake systems and, more specifically, to indicators which provide an indication of the application of a vehicle's brakes.

2. Description of the Prior Art:

Traffic fatalities and injuries during the past years have reached record numbers. In an attempt to reduce such fatalities and injuries, many safety features, such as seat belts and other safety items have been added to vehicles. However, more are needed as the number of vehicle related fatalities and injuries continues to increase.

Other types of safety systems which have been proposed for use on vehicles include light or indicator systems which provide an indication that the vehicle brakes are being applied, how much pressure is being exerted on the brake pedal or the rate of acceleration/deceleration of the vehicle. Such indicators are mounted on the rear of the vehicle in conjunction with the standard rear brake lights to warn following vehicles that the brakes of the vehicle in front are being applied and how hard the brakes are being applied. Separator indicator lights or the vehicle's turn signals have also been incorporated into such brake warning systems. However, such brake indicators are viewable only to a motorist behind a vehicle having such an indicator system.

One area which has not been addressed by such previously devised braking indicator systems is providing an indication to oncoming vehicles or pedestrians of the intention of the driver of a vehicle as to whether the driver is slowing down, coasting or maintaining the same speed. This is important at intersections when the driver of one vehicle is waiting for oncoming traffic to clear the intersection before making a turn. Often times, such a driver is unsure whether an oncoming vehicle is accelerating, applying brakes or merely coasting prior to braking to a stop or continuing through the intersection.

The need for such a front mounted braking indicator is also necessary for the driver of a vehicle stopped at a traffic light or on a road to enable the driver to determine if a vehicle approaching from the rear in the same lane is aware that his vehicle is standing still.

Thus, it would be desirable to provide a vehicle braking indicator which overcomes the above-listed problems. It would also be desirable to provide a vehicle braking indicator which provides an indication to oncoming vehicles or pedestrians when the driver of a particular vehicle is applying the vehicle's brakes. It would also be desirable to provide a vehicle braking indicator which indicates the relative pressure being applied to the brakes. Finally, it would be desirable to provide a vehicle braking indicator having the above-listed features which can be easily and inexpensively incorporated into existing vehicles without extensive modifications to such vehicles.

SUMMARY OF THE INVENTION

The present invention is a braking indicator for vehicles which provides an indication from the front of a vehicle that the vehicle's brakes are being applied.

The vehicle braking indicator includes a plurality of lights, preferably two, which are mounted on and viewable only from the front portion of the vehicle and viewable from in front or to the front side of the vehicle. A first means is provided for sensing the initial depression of the vehicle brake pedal. A second means is also provided for sensing further depression of the brake pedal. In a preferred embodiment, the first and second sensing means are embodied in an elongated rod mounted within a housing which has at least first and second detent portions. A contact is mounted within each detent portion of the rod and connected via an electrical conductor to one of the front mounted brake indicator lights.

An electrically conductive pin is mounted on a movable plunger attached to the vehicle brake actuator switch so as to move in conjunction with depression of the brake pedal. An initial depression of the brake pedal results in movement of the pin into the first detent thereby completing an electrical circuit from the vehicle battery through the first contact to the first front mounted brake light thereby providing an indication to vehicles or pedestrians in front of the vehicle that the vehicle's brakes have been initially applied.

Further depression of the brake pedal beyond the initial brake depression moves the pin into the second detent thereby completing a circuit through the second contact between the vehicle battery and the second brake indicator light. This activates the second brake indicator light to provide an indication to vehicles and pedestrians in front of the vehicle that the vehicle brakes have been depressed further beyond a light depression or initial brake depression. This provides an indication that the driver of the vehicle is intending to slow down the vehicle to a relatively slow speed or to a complete stop.

In an alternate embodiment, means are provided for sensing the speed of the vehicle. The speed sensing means may be in the form of a conventional transducer operating off of the speedometer cable of the vehicle to provide an indication of the vehicle speed. The speed sensing means provides an output at a pre-set speed, preferably a slow speed of 5-10 mph. The output from the speed sensing means is connected in series with the second contact so as to energize the second front mounted brake indicator light only when the brakes have been further depressed beyond the initial actuation of the brakes and the vehicle has slowed to the pre-set slow speed thereby providing a more accurate indication that the vehicle is slowing down to a slow speed or is coming to a complete stop.

The front mounted vehicle brake indicator apparatus of the present invention overcomes many of the problems encountered with previously devised systems for indicating that the brakes of a vehicle have been applied. The front mounted brake indicator apparatus of the present invention uniquely provides an indication to vehicles or pedestrians in front of or to the front sides of a vehicle that the driver of the vehicle has initially applied his brakes and how much pressure he is applying thereby providing an indication of the intentions of the driver of the vehicle as to slowing down or continuing at the same speed. This provides increased safety for vehicles making a turn in front of an oncoming vehicle as the driver's of such vehicles will be able to ascertain the intentions of the oncoming vehicle as to continuing at the same speed, slowing down, etc.

In the embodiment incorporating the speed sensing means, increased indication and safety for oncoming vehicle and pedestrians is provided since the drivers of such vehicles and pedestrians may more readily ascertain the intentions of the driver of an oncoming the vehicle as to whether the driver is decelerating the vehicle to a slow speed or is bringing the vehicle to a complete stop. Such front mounted brake indicator lights also provide increased safety for the driver of the vehicle which is stopped on a road since such a driver will be able to ascertain if an approaching vehicle in his lane is slowing down or braking to a complete stop.

The front mounted vehicle brake indicator of the present invention is simple in construction for a low manufacturing cost. Further, the present vehicle brake indicator can be applied to many different vehicles without requiring extensive modification of such vehicles thereby enabling the present invention to be employed in retrofit as well as new vehicle applications.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
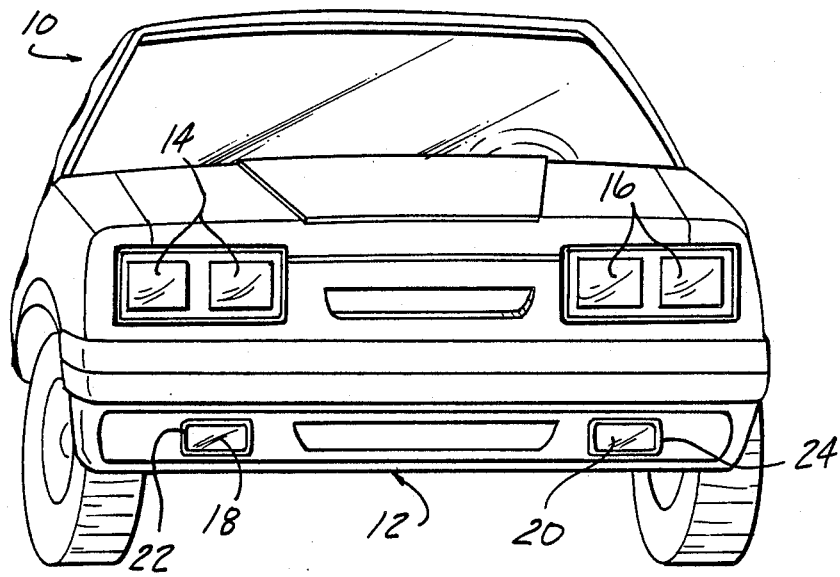
FIG. 1 is a pictorial representation of a vehicle having a front mounted brake indicator constructed in accordance with the teachings of the present invention mounted thereon.

Throughout the following description and drawing, an identical reference number is used to refer to the same component shown in multiple figures of the drawing.

Referring now to the drawing, and to FIG. 1 in particular, there is illustrated a vehicle 10 which has a front mounted vehicle braking indicator 12 constructed in accordance with the teachings of the present invention mounted thereon. The front mounted vehicle braking indicator 12 functions to indicate to vehicles and pedestrians in front or to the front side of the vehicle 10 of the intentions of the driver of the vehicle as to the application of the brakes of the vehicle 10, how much pressure is being applied and/or the speed of the vehicle while the brakes are being applied.

For a complete understanding of the present invention, it will be understood that the terms "viewable from the front or front sides of the vehicle" are meant to include the viewing of the brake indicator from directly in front or perpendicular of the vehicle, as well as to any angle from the perpendicular up to and including directly from the side of the front end of the vehicle 10.

As shown in FIG. 1, the vehicle 10 may be any conventional vehicle having front headlights 14 and 16, as well as side marker lights, turn signals, etc., not shown.

The front mounted vehicle braking indicator 12 includes a plurality of lights, such as lights 18 and 20. It will be understood, however, that although two lights, 18 and 20 are shown in FIG. 1, the front mounted vehicle braking indicator 12 of the present invention may be provided with any number of lights so as to provide any degree of indication of vehicle speed and brake application.

The front mounted brake indicator lights 18 and 20 are conventional lights including an energizable light bulb mounted within a housing 22 and covered by a glass or plastic lens. The lens may be transparent, opaque or of any desired color. It is also desirable to provide the lens of different colors to differentiate between the various indicator lights, particularly at long distances.

In a preferred mounting position shown in FIG. 1, the brake indicator lights 18 and 20 are mounted on the front of the vehicle 10 above, on, or below the bumper 24 of the vehicle. It is also possible to incorporate the front mounted brake indicator lights 18 and 20 with the front turn signals or parking lights of the vehicle 10.

Figure 2:
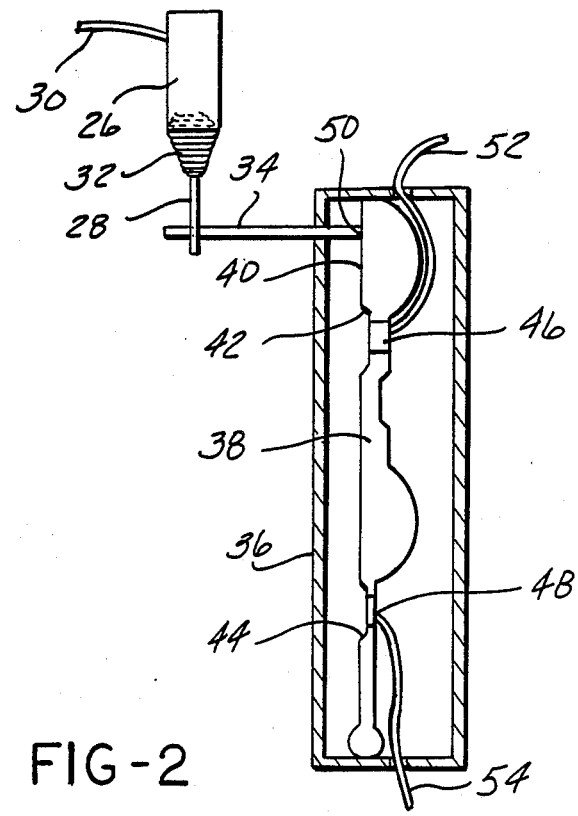
FIG. 2 is a partial cross-sectional view of the brake pedal actuation sensing means.

Referring now to FIG. 2, there is illustrated a means for sensing the actuation or initial depression of the vehicle brake pedal. As shown in FIG. 2, a conventional brake activator switch 26 is mounted in the vehicle 10. As is conventional, the switch 26 is actuated by depression of the vehicle brake pedal, not shown. Upon depression of the brake pedal, a spring biased plunger 28 projects outward from the switch 26 making an electrical connection within the switch 26 to connect power from the vehicle battery on conductor 30 to the rear brake lights of the vehicle 10. The plunger 28 is spring biased to retract within the switch housing 26 by a coil spring 32.

In adapting the brake switch 26 for use in the front mounted brake indicator 12 of the present invention, an elongated, electrically conductive pin 34 is mounted on and extends perpendicularly outward from one end of the plunger 28. The outer end of the pin 34 projects into an elongated housing 36 which is also mounted in a convenient location in the vehicle 10.

Means are provided within the housing 36 for sensing the initial depression of the vehicle brake pedal. A second means is also provided within the housing 36 for sensing further depression of the brake pedal beyond the initial brake depression as will occur when additional pressure is applied to the brake pedal.

The first and second sensing means are embodied in an elongated rod 38 which is provided with a cam surface 40 having first and second detents 42 and 44, respectively. First and second electrical contacts 46 and 48, respectively, in the form of a pad of electrically conductive material are mounted on the rod 38 within each of the first and second detents 42 and 44, respectively.

The outer end 50 of the conductive pin 34 is positioned to slidingly engage the cam surface 40 of the rod 38. Upon initial depression of the vehicle brake pedal, movement of the plunger 28 will cause the pin 34 to traverse along the cam surface 40 until the outer end 50 of the pin 34 engages the detent 42 and contacts the first electrical contact 46. This places the contact and the electrical conductor 52 connected thereto in series with the battery of the vehicle. The electrical conductor 52 extends outward from the housing 36 and is connected to one of the vehicle brake indicator lights, such as indicator light 18.

Further depression of the brake pedal results in further outward movement of the plunger 28 from the brake switch 26. This results in continued movement of the pin 34 along the cam surface 40 until the outer end 50 of the pin 34 engages the second detent 44 and comes in electrical contact with the second electrical contact 48. This completes an electrical circuit between the vehicle battery, the brake actuator switch 26, the pin 34, the second contact 48 and a second electrical conductor 54 which is connected to the second vehicle brake indicator 20.

Although the first and second detents 42 and 44 are shown as being separate in FIG. 2, it will be understood that the rod 38 may be constructed such that the first detent 42 extends substantially along the entire length of the rod 38. In this configuration, the electrical circuit formed between the pin 34 and the first contact 46 will remain connected from the initial depression of the brake pedal through further depression of the brake pedal even when the second electrical contact 48 is reached. This enables one or both of the front mounted vehicle brake indicators 18 and 20 to be energized at the same time.

Figure 3:
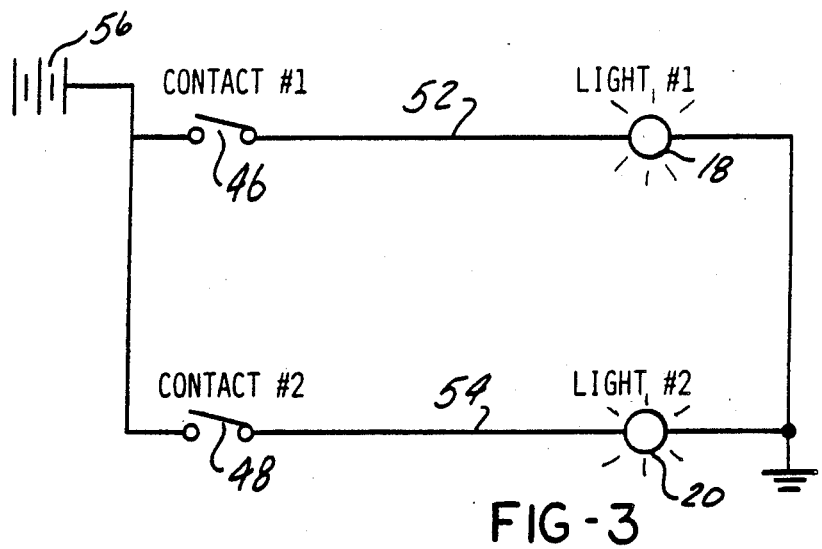
FIG. 3 is a schematic representation of one embodiment of means for activating the front mounted brake indicator lights.

Referring now to FIG. 3, there is a schematic diagram of the electrical circuit for the front mounted brake indicator apparatus 12 of the present invention. As noted above, the electrical conductors 52 and 54 extend outward from the housing 56 from the first and second contacts 46 and 48 and are connected to respective ones of the first and second front mounted vehicle brake indicators 18 and 20. This provides two electrical circuits such that connection of either or both of the contacts 46 and 48 through the pin 34 to the vehicle battery 56 provides current to the vehicle brake indicators energizing one or all of the indicators 18 and 20 as described above.

Thus, initial actuation of the brake pedal will result in energization of the first front mounted vehicle indicator 18 thereby providing an indication to vehicles or pedestrians in front of the vehicle that the brakes of the vehicle have been initially applied. Further depression of the brake pedal will cause the second front mounted vehicle brake indicator 20 to be energized thereby providing a further indication that additional brake pressure has been applied by the driver to bring the vehicle to a slower speed or to a complete stop. This enables vehicles as well as pedestrians in front of the vehicle 10 to ascertain the intentions of the driver of the vehicle 10 as it approaches such vehicles or pedestrians.

Figure 4:
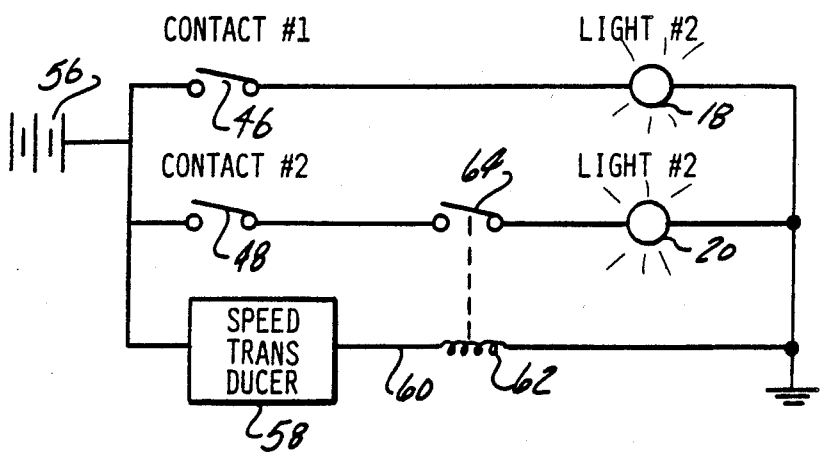
FIG. 4 is a schematic representation of another embodiment of means for actuating the front mounted brake indicator lights.

Additional safety may also be attained by connecting the means for sensing further depression of the brake pedal with a means for sensing of the relevant speed of the vehicle. As shown in FIG. 4, a conventional speed transducer 58 is mounted on the vehicle and connected to the speedometer cable of the vehicle or other speed indication source to provide an indication of the speed of the vehicle. The speed transducer 58, which may be any conventional transducer, is pre-setable at a certain speed to provide an output signal on conductor 60 when the pre-set speed is reached. As shown in FIG. 4, the presence of the output signal from the speed transducer 58 will energize the coil 62 of a relay having a movable contact 64. The movable contact 64 is connected in series with the second contact 48 between the vehicle battery 56 and the second vehicle brake indicator 20.

Thus, in operation, further depression of the brake pedal beyond the initial depression of the brake pedal will result in connection of the pin 34 with the second contact 48. When the vehicle has slowed to the pre-set speed, such as 5 or 10 mph, the speed transducer 58 will generate an output signal energizing the coil 62 of the relay and causing its movable contact 64 to move to a closed position thereby completing a circuit between a vehicle battery 56, the second contact 48, the contact 64 and the second brake indicator light 20 thereby energizing the second indicator light 20. This provides an indication to vehicles or pedestrians in front of or to the front sides of the vehicle 10 that the vehicle 10, in addition to having its brakes applied, is now moving at a relatively slow speed.

In summary, there has been disclosed the unique front mounted vehicle brake indicator which provides an indication to vehicles as well as pedestrians in front of a particular vehicle of the intentions of the driver of the vehicle for stopping or slowing down the vehicle. The front mounted vehicle brake indicators are sequentially energized upon initial depression of the brake pedal and upon further depression of the brake pedal thereby providing different indications to oncoming vehicles and pedestrians of the operative state of the vehicle's brakes thereby enabling such vehicles and pedestrians to make an informed decision as to the intentions of the driver of the vehicle.

The front mounted vehicle brake indicator of the present invention is simple in construction so as to have a low manufacturing cost. Further, it can be installed in any conventional vehicle without extensive modifications thereby expanding its range of applications to include retro-fit on existing vehicles, as well as use on new vehicles.

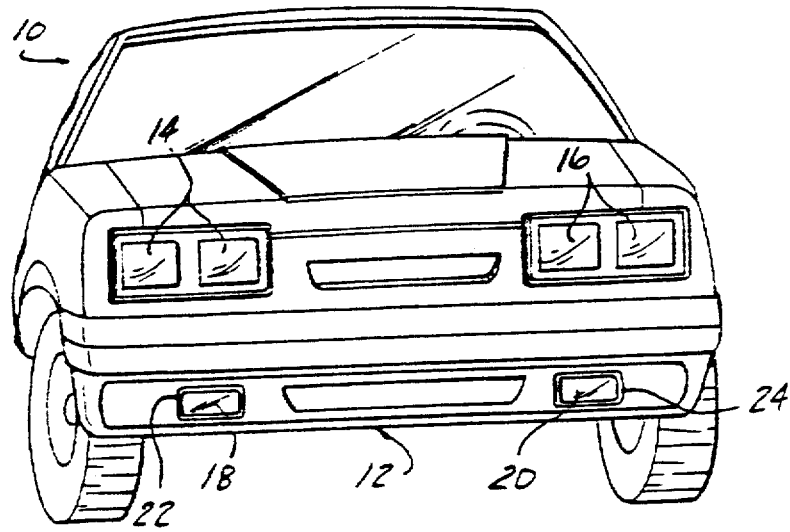

What is claimed is:

1. An indicator apparatus for use on a vehicle having a depressible brake pedal comprising:
   a first light and a second light spacedly mounted a predetermined distance apart on opposite sides of the front of the vehicle and separately viewable from the front of the vehicle as two separate lights;
   first means for sensing the initial depression of the brake pedal;
   second means for sensing further depression of the brake pedal; and
   means, responsive to the first and second sensing means, for actuating the first light at the initial depression of the brake pedal and the second light in combination with the initially actuated first light during further depression of the brake pedal.

2. The indicator apparatus of claim 1 further including means for sensing the speed of the vehicle; and
   means, responsive to the speed sensing means, for generating an output when the vehicle reaches a pre-determined speed;
   the second sensing means and the output from the speed sensing means cooperating to activate certain of the first and second lights during further braking operation when the vehicle has reached a pre-determined speed.

3. The indicator apparatus of claim 1 wherein each of the first and second lights is of a different color.

4. The indicator apparatus of claim 1 wherein the first and second means for sensing the actuation of the brake pedal comprises:
   a housing;

an elongated rod mounted within the housing and having a cam surface formed thereon;
first and second detents formed in the cam surface;
first and second contacts respectively mounted within the first and second detents;
the first and second contacts being electrically connected to the first and second lights;
an electrically conductive pin connected to a power source mounted on the brake actuation switch of the vehicle and movable with the brake actuation switch upon depression of the brake pedal between the first and second contacts to complete electrical circuits between the vehicle battery and the first and second contacts selectively energizing the first and second lights.

* * * * *

UNITED STATES PATENT AND TRADEMARK OFFICE
CERTIFICATE OF CORRECTION

PATENT NO. : 4,940,962

DATED : July 10, 1990

INVENTOR(S) : Jerry L. Sarokin

It is certified that error appears in the above-identified patent and that said Letters Patent is hereby corrected as shown below:

Title page showing illustrated figure should be deleted to appear as attached title page.

Signed and Sealed this

Twenty-third Day of October, 1990

Attest:

HARRY F. MANBECK, JR.

*Attesting Officer*  *Commissioner of Patents and Trademarks*

United States Patent
Sarokin

Patent Number: 4,940,962
Date of Patent: Jul. 10, 1990

[54] FRONT MOUNTED VEHICLE BRAKING INDICATOR

[76] Inventor: Jerry L. Sarokin, 33632 Old Timber, Farmington Hills, Mich. 48018

[21] Appl. No.: 158,878
[22] Filed: Feb. 22, 1988
[51] Int. Cl.⁵ .................................. B60Q 1/44
[52] U.S. Cl. ........................... 340/479; 340/466
[58] Field of Search .............. 340/66, 67, 69, 71, 340/73, 84, 479, 466, 467, 464; 200/61.89

[56] References Cited

U.S. PATENT DOCUMENTS

| | | | |
|---|---|---|---|
| 3,364,384 | 1/1968 | Denken | 340/66 X |
| 3,411,134 | 11/1968 | Shames | 340/71 |
| 3,510,838 | 5/1970 | Otto | 340/71 |
| 3,550,076 | 12/1970 | Kent | 340/22 |
| 3,601,794 | 8/1971 | Klein et al. | 340/62 |
| 3,631,390 | 12/1971 | Murphy | 340/62 |
| 3,659,268 | 4/1972 | Crawford | 340/71 |
| 3,688,258 | 8/1972 | Frey | 340/67 |
| 3,702,459 | 11/1972 | Banchan | 340/62 |
| 3,708,782 | 1/1973 | Mori | 340/66 |
| 3,710,315 | 1/1973 | Scheresberg | 340/71 X |
| 3,748,642 | 7/1973 | Radin et al. | 340/62 |
| 3,784,974 | 1/1974 | Hamashige | 340/73 |
| 3,914,739 | 10/1975 | Caughlin et al. | 340/72 |
| 3,952,284 | 4/1976 | Martin | 340/71 |
| 4,107,647 | 8/1978 | Yoshino | 340/71 |
| 4,127,844 | 11/1978 | Purdy | 340/71 |
| 4,173,012 | 10/1979 | Burger | 340/71 |
| 4,258,353 | 3/1981 | Carlson | 340/66 |
| 4,280,116 | 7/1981 | Camp | 340/67 |
| 4,384,269 | 5/1983 | Carlson | |
| 4,470,036 | 9/1984 | Doerr et al. | 340/66 |

FOREIGN PATENT DOCUMENTS

| | | | |
|---|---|---|---|
| 1187032 | 9/1959 | France | 340/71 |
| 0068436 | 5/1980 | Japan | 340/71 |

Primary Examiner—Joseph A. Orsino
Assistant Examiner—Brian R. Tumm
Attorney, Agent, or Firm—Basile and Hanlon

[57] ABSTRACT

A braking indicator for vehicles provides an indication from the front of the vehicle that the vehicle brakes are being applied. The indicator includes a plurality of lights, preferably two, which are mounted and viewable from the front of the vehicle. The first sensor is connected to the brake pedal to detect the initial depression of the brake pedal. A second sensor is connected to the brake system of the vehicle to sense further depression of the brake pedal. The first and second sensors are connected to certain of the front mounted indicator lights to energize certain of the front mounted indicator lights upon the initial depression of brake pedal and further depression of the brake pedal. Alternately, a sensor is connected to the speedometer of the vehicle to detect the speed of the vehicle. The speed sensor provides an output when the vehicle reaches a pre-determined speed, preferably a slow speed. The second sensor and the speed sensor cooperate to energize certain of the indicator lights during continued depression of the brake pedal when the vehicle reaches the pre-set slow speed.

4 Claims, 3 Drawing Sheets